US011017215B2

(12) United States Patent
Yang et al.

(10) Patent No.: US 11,017,215 B2
(45) Date of Patent: May 25, 2021

(54) TWO-STAGE PERSON SEARCHING METHOD COMBINING FACE AND APPEARANCE FEATURES

(71) Applicant: SHANGHAI JIAO TONG UNIVERSITY, Shanghai (CN)

(72) Inventors: Hua Yang, Shanghai (CN); Liangqi Li, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 17/030,358

(22) Filed: Sep. 23, 2020

(65) Prior Publication Data

US 2021/0012094 A1    Jan. 14, 2021

Related U.S. Application Data

(63) Continuation of application No. PCT/CN2019/108502, filed on Sep. 27, 2019.

(30) Foreign Application Priority Data

Nov. 29, 2018  (CN) .......................... 201811447035.4

(51) Int. Cl.
*G06K 9/00* (2006.01)
*G06F 16/55* (2019.01)
(Continued)

(52) U.S. Cl.
CPC ......... *G06K 9/00288* (2013.01); *G06F 16/51* (2019.01); *G06F 16/55* (2019.01);
(Continued)

(58) Field of Classification Search
None
See application file for complete search history.

(56) References Cited

U.S. PATENT DOCUMENTS 8,379,940 B2    2/2013  Wechsler et al.
8,503,800 B2 *  8/2013  Blonk ................ G06K 9/00261
                                                          382/226

(Continued)

FOREIGN PATENT DOCUMENTS

CN    107145826 A    9/2017
CN    107704811 A    2/2018
CN    109635686 A    4/2019

OTHER PUBLICATIONS

Internation Search Report of PCT/CN2019/108502, dated Dec. 30, 2019.

*Primary Examiner* — Bernard Krasnic
(74) *Attorney, Agent, or Firm* — True Shepherd LLC; Andrew C. Cheng

(57) ABSTRACT

A two-stage person searching method combining face and appearance features, comprises: detecting a face of a person utilizing a face detector, and outputting a face representation vector based on a face comparing model; ranking person sets to be matched according to an Euclidean distance to acquire a face ranking result; selecting a plurality of samples as multi-matching targets at the next stage according to the ranking result; using the selected multi-matching targets of different persons at the next stage in the same data set as mutual negative samples, so as to compress the sample space matched at the next stage; and finally re-recognizing multi-target persons, and ranking the image sets to be matched according to an average distance or similarity with multiple targets to output a final result.

7 Claims, 2 Drawing Sheets

(51) Int. Cl.
 *G06F 16/51* (2019.01)
 *G06F 17/16* (2006.01)

(52) U.S. Cl.
 CPC ..... *G06K 9/00228* (2013.01); *G06K 9/00268* (2013.01); *G06F 17/16* (2013.01)

(56) References Cited

U.S. PATENT DOCUMENTS

| | | |
|---|---|---|
| 10,007,707 B1 | 6/2018 | Balasia et al. |
| 2012/0120283 A1* | 5/2012 | Capata ............... G06K 9/00255 348/241 |
| 2015/0154229 A1* | 6/2015 | An ....................... G06F 16/583 707/728 |
| 2015/0278224 A1* | 10/2015 | Jaber .................. G06F 16/5854 707/749 |
| 2016/0307561 A1 | 10/2016 | Nanayakkara et al. |

* cited by examiner

TWO-STAGE PERSON SEARCHING METHOD COMBINING FACE AND APPEARANCE FEATURES

CROSS-REFERENCE TO RELATED APPLICATIONS

This application, is a continuation of International Patent Application No. PCT/CN20191108502 with a filing date of Sep. 27, 2019, designating the United States, now pending, and further claims priority to Chinese Patent Application No. 201811447035.4 with a filing date of Nov. 29, 2018. The content of the aforementioned applications, including any intervening amendments thereto, are incorporated herein by reference.

TECHNICAL FIELD

The disclosure relates to the field of computer vision technologies, and particularly to a two-stage person searching method combining face and appearance features.

BACKGROUND OF THE PRESENT INVENTION

At present, the person re-identification technology plays a more and more important role in practical application, for example security monitoring, crowd traffic monitoring and person behavior analysis. Recent research of person re-identification most focuses on person matching among multiple cameras under the similar scenes.

However, in practical application, for example, when criminal suspects are under surveillance, there is often large appearance difference between a target person image (such as portrait picture) and a person image to be matched which is photographed by a camera. The traditional person re-identification cannot electively match the target person. The reliable person, feature should be face feature under this scene, but if the face is only used for matching, a target person sample without face cannot be matched, it is possible to loss the trace of its track.

SUMMARY OF PRESENT INVENTION

The objective of the disclosure is to provide a two-stage person searching method combining face and appearance features based on deep learning in order to overcome the defects in the prior art, and the method combines face identification and person re-identification. Firstly, the method provided by the disclosure extracts a feature with high resolution based on a convolution neural network (CNN), and adopts a DenseNet network structure (see Goo Huang, Zhuang Liu, Laurens van der Maaten, and Kilian Q Weinberger, "Densely connected convolutional networks," in Proceedings of the IEEE Conference on Computer Vision and Pattern Identification, 2017); secondly, the disclosure provides a two-stage person searching method combining face and appearance features, which utilizes face detection and identification to start from the target person image so as to generate Multi-query from candidate person images; and finally, the disclosure proposes a method for compressing a person re-identification and matching sample space, thereby promoting the accuracy rate of person re-identification.

The disclosure is realized through the following technical solution:

A two-stage person searching method combining face and appearance features, comprises:

Acquiring an image $I_C(x, y)$ containing a target person, which is called Cast;

Acquiring a panoramic image to be identified which is called Gallery and person, coordinate information in the panoramic image, and determining an image $I_G(x, y)$ containing a candidate person;

Calculating a score of face similarity between the target person and the candidate person according to the image $I_C(x, y)$ and the image $I_G(x, y)$;

Ranking according to the face score, using a corresponding image containing the candidate person as a target image $I_Q(x, y)$ for person re-identification if the score is larger than or equal to, a preset threshold; using the corresponding image containing, the candidate person as the panoramic image for person re-identification if the score is less than the preset threshold;

Filtering each panoramic image for person re-identification corresponding to the target person to obtain a processed candidate person image $I_G'(x, y)$ if the image $I_C(x, y)$ contains two or more target persons;

Calculating an initial Euclidean distance between the candidate person in the target image $I_Q(x, y)$ and the candidate person in the processed candidate person image $I_G'(x, y)$ according to the target image $I_Q(x, y)$ and the processed candidate person image $I_G'(x, y)$; and Using an average Euclidean distance between the candidate person in the processed candidate person image $I_G'(x, y)$ and the candidate person in the target image $I_Q(x, y)$ as the final Euclidean distance of the candidate person, and ranking the candidate persons in the processed candidate person image $I_G''(x, y)$ according to the final Euclidean distance to obtain a corresponding ranking result.

Optionally, calculating the score of face similarity between the target person and the candidate person according to the image $I_C(x, y)$ and the image $I_G(x, y)$ comprises:

Scaling the image $I_C(x, y)$ according to a first preset scale to obtain a first scaled image;

Inputting the first scaled image into a Multi-task Cascaded Convolutional Neural Network (MTCNN) to obtain the face image of the target person;

inputting the face image of the target person into Insight Face network to obtain the face feature vector $x_C$ of the target person:

Scaling the image $I_G(x, y)$ according to a first preset scale to obtain a second scaled image; and inputting the second scaled image into the MTCNN to judge whether the face image of the candidate person is contained;

Inputting the face image of the candidate person into the Insight Face network to obtain the face feature vector $x_G$ if the face image of the candidate person is contained;

Calculating the score of face similarity between the candidate person and the target person according to a cosine similarity calculation formula which is as follows:

$$s_{C,G} = \frac{x_C \cdot x_G}{|x_C||x_G|}$$

wherein $s_{C,G}$ is the score of face similarity between the candidate person and the target person, $x_C$ is the face feature vector corresponding to Cast person, and $x_G$ is the face feature vector corresponding to Gallery person; and Determining the score of face similarity between the candidate person and the target person as −1 if the face image of the candidate person is not contained.

Optionally, inputting the first scaled image into the MTCNN to obtain the face image of the target person comprises:

Acquiring the face image of the target person and N key points corresponding to the face image through the MTCNN; N being an natural number greater than 1; and Acquiring the face image of the target person having the highest confidence coefficient and N key points corresponding to the face image if the quantity of the target face image acquired through the MTCNN is larger than 1.

Optionally, the preset threshold is 0.35.

Optionally, after calculating the score of face similarity between the target person and the candidate person according to the image $I_C(x, y)$ and the image $I_G(x, y)$, the method provided by the disclosure further comprises: selecting the candidate person whose score is in the first M as the target image $I_Q(x, y)$ if the quantity of the person image whose score is greater than or equal to the preset threshold is less than M; and M is a natural number being greater than 1.

Optionally, calculating an initial Euclidean distance between the target person and the candidate person according to the target image $I_Q(x, y)$ and the processed candidate person image $I_G'(x, y)$ comprises:

Scaling the target image $I_Q(x, y)$ according to the second preset scale to obtain a third scaled image;

Inputting the third scaled image into the DenseNet-based person re-identification network to obtain the feature vector $\hat{x}_Q$ of the target person;

Scaling the processed candidate person image $I_G'(x, y)$ according to the second preset scale to obtain a fourth scaled image;

Inputting the fourth scaled image into the DenseNet-based person re-identification network to obtain the feature vector $\hat{x}_G$ of the candidate person;

Calculating the Euclidean distance between the candidate person in the processed candidate person image $I_G'(x, y)$ and the candidate person in the target image $I_Q(x, y)$, wherein the calculation formula is as follows:

$$\hat{s}_{Q,G} = \frac{\hat{x}_Q \cdot \hat{x}_G}{|\hat{x}_Q||\hat{x}_G|};$$

$$D_{Q,G} = 1 - \hat{s}_{Q,G};$$

wherein, $\hat{s}_{Q,G}$ is the similarity between the target person image and the candidate person image, $\hat{x}_Q$ is the normalized target person feature vector, $\hat{x}_G$ is the normalized candidate person feature vector, $D_{Q,G}$ is a distance between the target person image and the candidate person image; and Correcting the calculated Euclidean distance according to a re-ranking algorithm based on K complementary neighborhood to obtain the initial distance between the candidate person in the processed candidate person image $I_G'(x, y)$ and the candidate person in the target image $I_Q(x, y)$.

Optionally, filtering each panoramic image for person re-identification corresponding to the target person to obtain the processed candidate person image $I_G'(x, y)$ if the image $I_C(x, y)$ contains two or more target persons comprises:

Assuming that the image $I_C(x, y)$ contains target person A and target person B, since panoramic image sets corresponding to the target person A and the target person B are the same, when an image in the panoramic image set is the target image of the target person A, canceling the image from the panoramic image set of the target person B.

Compared with the prior art, the disclosure has the beneficial effects:

1) The DenseNet-based convolution neural network is utilized to extract features with higher robustness;

2) Face information is effectively utilized to firstly acquire the face-containing target image with high confidence coefficient, and then person re-identification is performed according to the appearance feature so as to obtain the final candidate person ranking result, and the identification effect is better; and 3) Panoramic images for person re-identification among multiple persons are designed for filtration, the person re-identification matching sample space is compressed, so as to reduce calculation amount and improve the accuracy rate.

DESCRIPTION OF THE DRAWINGS

Other features, purposes and advantages of the disclosure will become more apparent by reading the detailed description made with reference to the following drawings.

DETAILED DESCRIPTION OF PREFERRED EMBODIMENTS

The disclosure will be described in detail in combination with embodiments in the following. The following examples will help those skilled in the art understand the disclosure further but do not limit the disclosure in any form. It should be noted that persons of ordinary skill in the art can also make several changes and improvements without departing from the concept of the disclosure. These belong to the protective scope of the disclosure.

Figure 1:
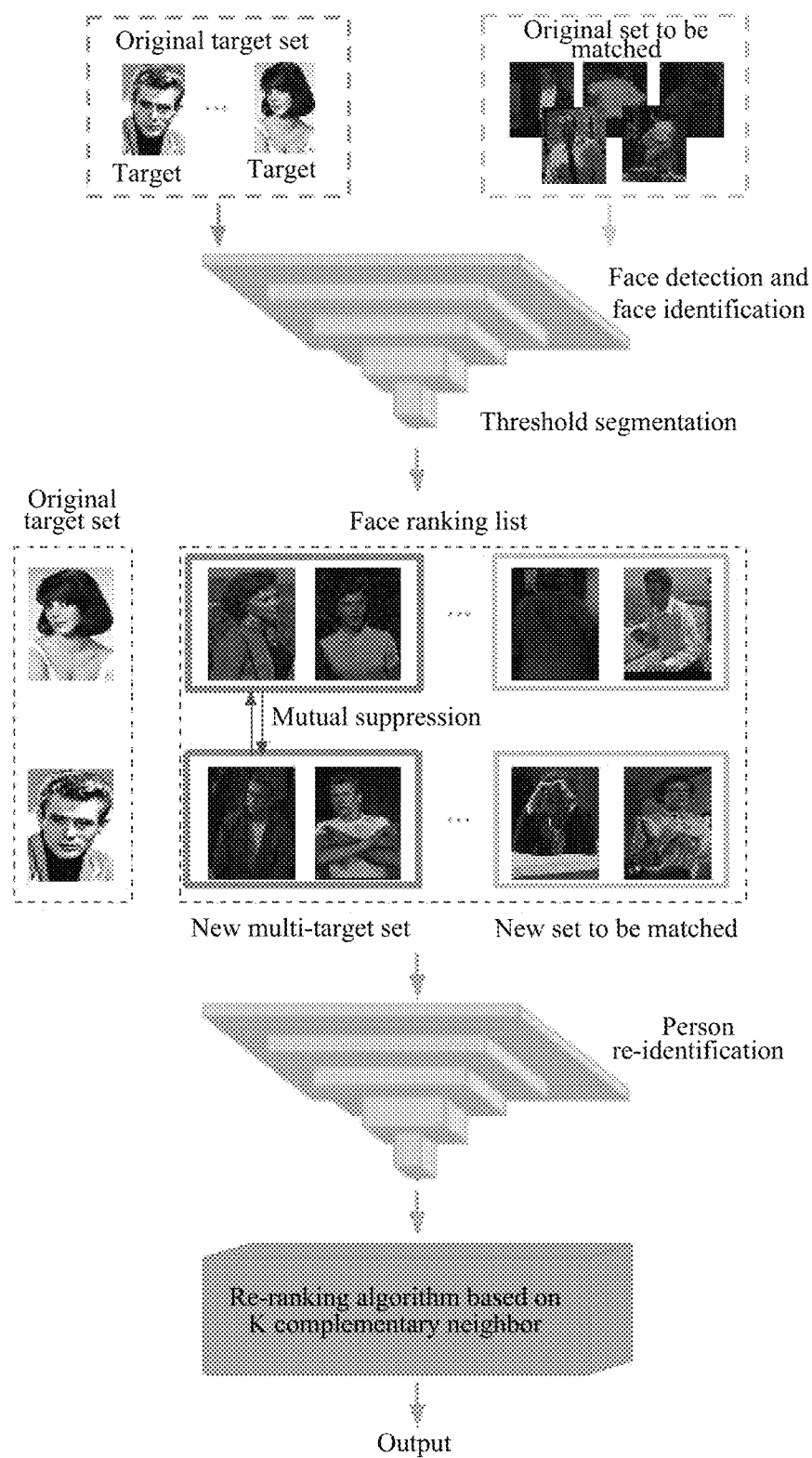
FIG. 1 is a principle diagram of a two-stage person searching method combining face and appearance features according to the disclosure.
Figure 2:
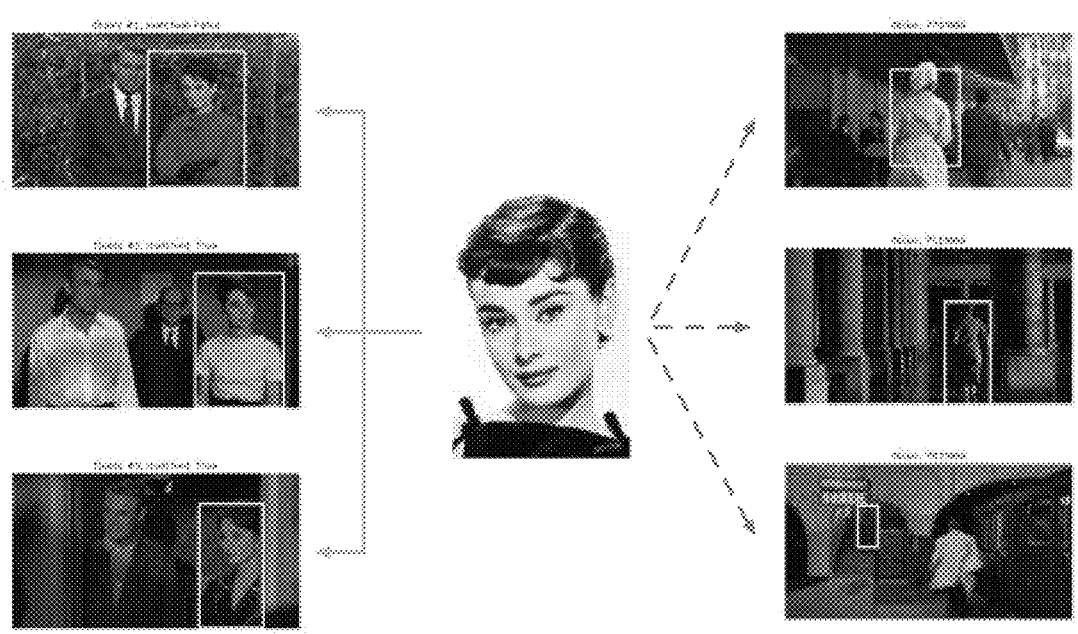
FIG. 2 is a diagram showing the effect of a two-stage person searching method combining face and appearance features according to the disclosure.

FIG. 1 is a principle diagram of a two-stage person searching method combining face and appearance features provided by the disclosure. As shown in FIG. 1, face features are extracted from the original target, set and the original set to be matched, and face detection and, face identification are performed to obtain the score of face similarity between the target person and the candidate person. Then, ranking is conducted according to the score, and threshold segmentation is conducted on the original set to be matched according to a preset threshold to obtain a new multi-target set and a new set to be matched. If the original target set contains two or more target persons, a panoramic image for person re-identification corresponding to each target person is filtered to obtain the processed candidate, person image. Among them, the new multi-target set contains a target image for person re-identification; and the new set to be matched contains the processed candidate person image for person re-identification. Then the new multi-target set and the new set to be matched are subjected to person re-identification, and the calculated Euclidean distance is corrected according to re-ranking algorithm based on K complementary neighborhood to finally output a ranking result of candidate persons. FIG. 2 is a diagram showing the effect of the two-stage person searching method combining face and appearance features according to the disclosure, a full face photograph represented by a left solid arrow can only be identified, and a person image without the face represented by a right dotted arrow can not be identified. However, the method of the disclosure combines the face feature with the appearance feature, so as to effectively identify images such as shadows, thereby improving the performance of image identification.

The two-stage person searching method combining face and appearance features provided by the disclosure specifically comprises the steps:

S101, acquiring an image $I_C(x, y)$ containing a target person.

In the present embodiment, the original target set may contain images of multiple target persons, or one image contains multiple target persons.

S102, acquiring a panoramic image to be identified (Gallery), and person coordinate information in the panoramic image, and determining an image $I_G(x, y)$ containing a candidate person.

S103, calculating the score of face similarity between the target person and the candidate person, according to the image $I_C(x, y)$ and the image $I_G(x, y)$.

In the present embodiment, the given input target person image $I_C(x, y)$, namely Cast, is transmitted to the neural network, and scaled to a fixed scale (112*112) in a proportion, the face in the current target person image is detected by utilizing the MTCNN, the face position is determined and, the face is transmitted to the Insight Face network to extract features to obtain 512-dimensional vector $x_C \in R^{512}$.

The person image $I_G(x, y)$ is acquired according to the given input panorama image (Gallery) and the person coordinate information, then transmitted to the neural network and scaled to a fixe scale (112*112) in a proportion, and whether the face is contained in the current person image is detected by utilizing the MTCNN. If the face is contained, the face position is determined and the face is transmitted to the Insight Face network to extract features to obtain 512-dimensional vector $x_C \in R^{512}$.

The face similarity between the target person and the candidate person is calculated, and the following cosine similarity calculation formula is utilized to obtain the score:

$$s_{C,G} = \frac{x_C \cdot x_G}{|x_C||x_G|};$$

If no face is detected, the score of the candidate person image is set to be −1.

Preferably, the MTCNN outputs a region where the face is located and 10 corresponding face key points: if MTCNN detects more than one face region in one person image, the face region having the highest confidence coefficient and corresponding face key points are selected and output.

Preferably, the features output by the network are, normalized firstly when the score is calculated, and then vector point multiplication is conducted; matrix multiplication is utilized to accelerate calculation when specific operation is conducted.

S104, ranking according to the face score, using the corresponding image containing the candidate person as a target image $I_Q(x, y)$ (Multi-query) for person re-identification if the score is larger than or equal to a preset threshold; and using the corresponding image containing the candidate person as the panoramic image (Gallery) for person re-identification if the score is less than the preset threshold.

In the present embodiment, all the candidate person images are ranked from large to small according to the similarity with the target person, namely Cast. The score of the candidate person images with no face detected is set as −1, and then the candidate person images with no face detected are ranked to the end, so as to obtain a face similarity ranking list.

The threshold of similarity is set according to the experience. The candidate person, image whose score is greater than the threshold is taken as Multi-query for subsequent person re-identification, and the remaining candidate person images whose scores are less than the threshold are taken as Gallery for subsequent person re-identification.

Preferably, the candidate person images with scores are only one part of all the candidate person images, and Multi-query for subsequent re-identification is generated from here.

Preferably, the similarity threshold of 0.35 is generally selected, that is, the candidate persons with face similarity of 0.35 or more are selected as Multi-query for subsequent re-identification; if the quantity of candidate persons being more than thresholds of some target persons is too less, such as less than 5, 5 candidates with, the highest scores are selected as Multi-query for subsequent re-identification.

S105, filtering each panoramic image for person re-identification corresponding to the target person to obtain the processed candidate person image $I_G'(x, y)$ if the image $I_C(x, y)$ contains two or more target persons.

In the present embodiment, Multi-query images corresponding, to remaining target persons in the data set are removed from Gallery of the current target persons to reduce a matching sample space for person re-identification.

Preferably, in the same data set, the candidate person sets of different target persons are the same, Multi-query corresponding to person A can be probably considered as the person A because it, has high face similarity with person A, and therefore this part of Multi-query is removed from Gallery of person B, a person re-identification matching space of person B is reduced, and the accuracy rate of matching is improved.

S106, calculating an initial Euclidean distance between the candidate person in the target image $I_Q(x, y)$ and the candidate person in the processed candidate person image $I_G'(x, y)$ according to the target image $I_Q(x, y)$ and the processed candidate person image $I_G'(x, y)$.

In the present embodiment, all the Multi-query images $I_Q(x, y)$ of the current, persons are transmitted into the neural network and scaled to a fixed scale (256*256) in a proportion, and the feature vector $\hat{x}_Q \in R^{1024}$ of the Multi-query image is extracted by utilizing the DenseNet-based person re-identification network.

All the Gallery images $I_G(x, y)$ of the current persons are transmitted into the neural network and scaled to a fixed scale (256*256) in a proportion, and the feature vector $\hat{x}_G \in^{1024}$ of the Gallery image is extracted by utilizing the DenseNet-based person re-identification network.

The similarity of the Multi-query person and the Gallery person is calculated, and the score is obtained by utilizing the following cosine similarity calculation formula:

$$\hat{s}_{Q,G} = \frac{\hat{x}_Q \cdot \hat{x}_G}{|\hat{x}_Q||\hat{x}_G|};$$

The result of 1 minus $\hat{s}_{Q,G}$ is used as a distance between the Multi-query person and the Gallery person, and the distance between the Multi-query person and the Gallery person is recalculated according to a re-ranking algorithm based on K complementary neighborhood.

Preferably, the person re-identification network is, retrained at first.

Preferably, a process for training the person re-identification network, is specifically as follows:

Person re-identification is regarded as a classification task, and all ID numbers in the training set are counted as the number of classification categories. The input image is scaled to 288×288 size, and, randomly cut into 256×256 size. The data is augmented by random horizontal flipping and then input into DenseNet network to extract features, and a feature image having a 8×8×1024 size is output, the feature image is subjected to Average Pooling to obtain a 1024-dimensional vector, and a vector corresponding to the category number dimension is output by a full connection layer. The probability of each ID corresponding to the input image is obtained by activation of Softmax function.

The person re-identification result is supervised by the following Loss function:

$$L(x, y) = -\log p_t$$
$$p_i = \frac{e^{x_i}}{\sum_j e^{x_j}}$$

wherein, $p_i$ represents the probability that the current person belongs to the $i^{th}$ category, and $p_t$ represents the probability corresponding to the real category.

S107, using an average Euclidean distance between the candidate person in the processed candidate person image $I_G'(x, y)$ and the candidate person in the target image $I_Q(x, y)$ as the final Euclidean distance of the candidate person, and ranking, the candidate persons in the processed candidate person image $I_G'(x, y)$ according to the final Euclidean distance to obtain a corresponding ranking result.

In the present embodiment, for a Gallery person, an average distance relative to all the multi-query persons is calculated as a final distance; all the Gallery persons are ranked, according to the distance from small to large, and the final matching result is output.

In the present embodiment, the existing face detector is, used to detect the face of the given person; a face comparing model is trained based on the open large data set and a face representation vector is output; the person sets to be matched are ranked according to the Euclidean distance, and a more robust face ranking result is obtained by using the re-ranking algorithm; several samples are selected from the ranking result according to the distance from the original matching target as the multi matching targets at the next stage; the multi-matching targets at the next stage selected from different persons in the same data set are used as mutual negative samples, so as to reduce the sample space matched at the next stage; finally, multi-target person re-identification is conducted, and the image sets to be matched are ranked according to the average distance or similarity with multiple targets and the final result is output. According to the disclosure, faces and person re-identification are combined to search target persons through the convolution neural network based on DenseNet, robustness is improved through well-designed constraints, calculation amount is calculated, and person searching performance is further promoted.

The present embodiment is further described in combination with embodiments.

The training data used in this embodiment comes from sampling frames of 115 Chinese and Western movies. Each movie can be regarded as an independent data set, and the average number of persons to be searched in each movie is 6.7. Validation data and test data respectively include 19 movies and 58 movies.

Experiments prove that the method in the present embodiment can well combine face identification and person re-identification to complete the person searching task. Table 1 and table 2 are respectively person re-identification results on the verification data set and the test data set in the present embodiment, and an evaluation standard adopts mAP (mean Average Precision).

TABLE 1

| Methods | Multi-query | Re-ranking algorithm | Backbone network | mAP (%) |
|---|---|---|---|---|
| Baseline I | Only face | No | ResNet-101 | 53.75 |
| Baseline II | Single query | No | ResNet-50 | 37.85 |
| Baseline III | First 5 | No | ResNet-50 | 58.23 |
| Baseline IV | Only face | Only face | ResNet-50 | 58.50 |
| Baseline V | Threshold 0.35 | No | ResNet-50 | 59.47 |
| Baseline VI | Threshold 0.35 | Only person | ResNet-50 | 62.18 |
| Baseline VII | Threshold 0.35 | Face and person | ResNet-50 | 65.32 |
| Baseline VIII | Threshold 0.35 | Face and person | DenseNet-121 | 67.55 |
| Baeline IX | Threshold 0.35 | Face and person | DenseNet-201 | 69.46 |
| The present embodiment | Threshold 0.35 | Face and person | DenseNet-201 | 70.89 |

TABLE 2

| Methods | Multi-query | Re-ranking algorithm | Backbone network | mAP (%) |
|---|---|---|---|---|
| Baseline I | First 5 | Only face | ResNet-50 | 57.69 |
| Baseline II | Threshold 0.35 | Only face | DenseNet-121 | 74.72 |
| Baseline III | Threshold 0.35 | Face and person | DenseNet-121 | 75.66 |
| Baseline IV | Threshold 0.35 | Face and person | DenseNet-201 | 76.12 |
| The present embodiment | Threshold 0.35 | Face and person | DenseNet-201 | 76.71 |

It can be seen that through the results obtained by the present embodiment, the performance of person re-identification in the person searching task can be greatly improved. In addition, the present embodiment adopts an integrated processing manner, so as to make full use of the results of face detection and greatly reduce the research complexity in practical application.

The embodiments of the disclosure are described above. It should be understood that the disclosure is not limited to the above-mentioned specific embodiments, and those skilled in the art can make various transformations or modifications within the scope of the claims, which does not affect the essence of the disclosure.

We claim:

1. A two-stage person searching method combining face and appearance features, comprising:
   acquiring an image $I_C(x, y)$ containing at least two target persons, and wherein (x, y) is a two-dimensional coordinate of the image;
   acquiring a panoramic image to be identified and person coordinate information in the panoramic image, and determining an image $I_G(x, y)$ containing a candidate person based on the panoramic image and the person coordinate information;

calculating scores of face similarity between each target person and the candidate person according to the image $I_C(x, y)$ and the image $I_G(x, y)$;

ranking according to the scores of face similarity, if the score is larger than or equal to a preset threshold, using corresponding image containing the candidate person as a target image $I_Q(x, y)$ for person re-identification; and if the score is less than the preset threshold, using the corresponding image containing the candidate person as the panoramic image for person re-identification;

filtering the panoramic image for person re-identification corresponding to each target person to obtain a processed candidate person image $I_G'(x, y)$ if the image $I_C(x, y)$ contains two or more target persons;

calculating an initial Euclidean distance between the candidate person in the target image $I_Q(x, y)$ and the candidate person in the processed candidate person image $I_G'(x, y)$ according to the target image $I_Q(x, y)$ and the processed candidate person image; and using an average Euclidean distance between the candidate person in the processed candidate person image $I_G'(x, y)$ and the candidate person in the target image $I_Q(x, y)$ as a final Euclidean distance of the candidate person, and ranking candidate persons in the processed candidate person image $I_G'(x, y)$ according to the final Euclidean distance to obtain a corresponding ranking result.

2. The two-stage person searching method combining face and appearance features according to claim 1, wherein calculating the score of face similarity between the target person and the candidate person according to the image $I_C(x, y)$ and the image $I_G(x, y)$ comprises:

scaling the image $I_C(x, y)$ according to a first preset scale to obtain a first scaled image;

inputting the first scaled image into a Multi-Task Cascaded Convolutional Neural Network (MTCNN) to obtain a face image of the target person;

inputting the face image of the target person into an Insight Face network to obtain a face feature vector $x_C$ of the target person;

scaling the image $I_G(x, y)$ according to the first preset scale to obtain a second scaled image; and inputting the second scaled image into the MTCNN to judge whether a face image of the candidate person is contained;

inputting the face image of the candidate person into the Insight Face network to obtain the face feature vector $x_G$ of the candidate person if the face image of the candidate person is contained;

calculating the score of face similarity between the candidate person and the target person according to a cosine similarity calculation formula as follows:

$$s_{C,G} = \frac{x_C \cdot x_G}{|x_C||x_G|}$$

wherein $s_{C,G}$ is the score of face similarity between the candidate person and the target person, $x_C$ is the face feature vector corresponding to Cast person, and $x_G$ is the face feature vector corresponding to Gallery person; and determining the score of face similarity between the candidate person and the target person as −1 if the face image of the candidate person is not contained.

3. The two-stage person searching method combining face and appearance features according to claim 2, wherein inputting the first scaled image into the MTCNN to obtain the face image of the target person comprises:

acquiring the face image of the target person and N key points corresponding to the face image through the MTCNN; N being an natural number greater than 1; and acquiring the face image of the target person having a highest confidence coefficient and N key points corresponding to the face image if a quantity of the target face images acquired through the MTCNN is greater than 1.

4. The two-stage person searching method combining face and appearance features according to claim 1, wherein the preset threshold is 0.35.

5. The two-stage person searching method combining face and appearance features according to claim 1, further comprising: after calculating the scores of face similarity between each target person and the candidate person according to the image $I_C(x, y)$ and the image $I_G(x, y)$, selecting the candidate person whose score is in the first M as the target image $I_Q(x, y)$ for person re-identification if a quantity of person images whose score is greater than or equal to the preset threshold is less than M; wherein, M is a natural number being greater than 1.

6. The two-stage person searching method combining face and appearance features according to claim 1, wherein calculating the initial Euclidean distance between the target person and the candidate person according to the target image $I_Q(x, y)$ and the processed candidate person image $I_G'(x, y)$ comprises:

scaling the target image $I_Q(x, y)$ according to a second preset scale to obtain a third scaled image;

inputting the third scaled image into a DenseNet-based person re-identification network to obtain a feature vector $\hat{x}_Q$ of the target person;

scaling the processed candidate person image $I_G'(x, y)$ according to the second preset scale to obtain a fourth scaled image;

inputting the fourth scaled image into the DenseNet-based person re-identification network to obtain a feature vector $\hat{x}_G$ of the candidate person;

calculating the Euclidean distance between the candidate person in the processed candidate person image $I_G'(x, y)$ and the candidate person in the target image $I_Q(x, y)$, wherein the calculation formula is as follows:

$$\hat{s}_{Q,G} = \frac{\hat{x}_Q \cdot \hat{x}_G}{|\hat{x}_Q||\hat{x}_G|};$$

$$D_{Q,G} = 1 - \hat{s}_{Q,G};$$

wherein, $\hat{s}_{Q,G}$ is a similarity between the target image and the processed candidate person image, $\hat{x}_Q$ is a normalized target person feature vector, $\hat{x}_G$ is a normalized candidate person feature vector, and $D_{Q,G}$ is a distance between the target image and the processed candidate person image; and correcting the calculated Euclidean distance according to a re-ranking algorithm based on K complementary neighborhood to obtain the initial Euclidean distance between the candidate person in the processed candidate person image $I_G'(x, y)$ and the candidate person in the target image $I_Q(x, y)$.

7. The two-stage person searching method combining face and appearance features according to claim 1, wherein filtering each panoramic image for person re-identification corresponding to the target person to obtain the processed candidate person image $I_G'(x, y)$ if the image $I_C(x, y)$ contains two or more target persons comprises:

assuming that the image $I_C(x, y)$ contains a target person A and a target person B, since panoramic image sets corresponding to the target person A and the target person B are the same, when an image in the panoramic image set is the target image of the target person A, canceling the image from the panoramic image set of the target person B.

\* \* \* \* \*